United States Patent
Vivacqua et al.

Patent Number: 5,752,299
Date of Patent: May 19, 1998

[54] SEAT BELT BUCKLE WITH USAGE INDICATOR

[75] Inventors: Raymond Vivacqua, Northville; Ronald Marker, Sterling Heights; H. John Miller, Macomb Township, all of Mich.; Harjeet Gill, Windsor, Canada

[73] Assignee: AlliedSignal Inc., Morristown, N.J.

[21] Appl. No.: 642,977

[22] Filed: May 6, 1996

[51] Int. Cl.$^6$ ........................... A44B 11/25
[52] U.S. Cl. .................. 24/633; 297/468; 24/303
[58] Field of Search ............... 24/633, 636–638, 24/640, 641, 630, 645, 650, 646, 303; 297/468

[56] References Cited

U.S. PATENT DOCUMENTS

| 4,943,087 | 7/1990 | Sasaki | 297/468 X |
| 5,060,097 | 10/1991 | Saito | 24/303 X |
| 5,218,744 | 6/1993 | Saito | 24/633 X |
| 5,233,732 | 8/1993 | Yamanishi | 24/633 X |
| 5,274,890 | 1/1994 | Shimizu et al. | 24/633 X |
| 5,341,546 | 8/1994 | Burke | 24/641 |
| 5,353,482 | 10/1994 | Ziaylek, Jr. et al. | 24/630 X |

FOREIGN PATENT DOCUMENTS

| 122238 | 10/1984 | European Pat. Off. | 24/633 |
| 141734 | 5/1985 | European Pat. Off. | 24/633 |
| 2369949 | 7/1978 | France | 24/633 |
| 3302723 | 8/1984 | Germany | 24/633 |
| 3432088 | 2/1985 | Germany | 24/633 |
| 3341568 | 5/1985 | Germany | 24/633 |
| 3705846 | 9/1987 | Germany | 24/633 |

*Primary Examiner*—Jose V. Chen
*Assistant Examiner*—Robert J. Sandy
*Attorney, Agent, or Firm*—Markell Seitzman

[57] ABSTRACT

A seat belt buckle (20,20') comprising a frame (22), a locking element (30) movably disposed on the frame and movable between an unlocked position and a locked position, the frame including a locking element receiving opening (28) to receive the locking element when it is moved to its locked position in response to insertion of the tongue (52) having a mating portion (50) which interacts with the locking element, and non-contacting and direct sensing sensor such as a Hall effect sensor and magnet are provided to sense the presence of the locking element with the receiving opening (28).

11 Claims, 3 Drawing Sheets

SEAT BELT BUCKLE WITH USAGE INDICATOR

The present invention generally relates to seat belt buckles and more particularly to a buckle with a usage indicator.

Seat belt buckles used in the front seats of a vehicle include a switch that is opened or closed when the tongue (also called a latch plate) is inserted into the buckle frame to provide an indicator signal to deactivate an audible warning signal. As is known in the art a typical seat belt buckle includes a frame having opening therein to receive a locking or latching element. The locking element is moved from an unlocked position to the locked position as the tongue is pushed into the buckle. The tongue, as it is inserted into the frame pushes a spring loaded ejector to a compressed position and moves or assists in moving the locking element to enter a receiving hole in the tongue. The locking element is moved to its unlocked position, remote from the tongue's hole as the buckle's release button is depressed and the ejector is now free to push the tongue out of the buckle frame. To sense the locked condition of these buckles the ejector is typically fitted with an extension. As the ejector is moved to its biased position as the tongue is inserted the ejector extension opens or closes an electrical switch which generates a signal indicative of the fact that the seat belt is being used. As can be appreciated the interaction of the ejector extension and the switch directly measures the relationship between the ejector and the switch and only provides an indirect indication that the locking element has been positioned in its locking position within the receiving opening of the tongue or in the frame. The switches used in the prior art include reed switches having two electrical connectors wherein the ejector extension slides in between the two connectors to change the electrical state of the switch. As there is a continuous wiping action between the ejector extension and the connectors these connectors become less robust over time. Another type of mechanism switch used in the prior art is a micro-switch having a lever arm that is moved by the ejector.

It is an object of the present invention to provide a seat belt buckle with a sensing means that provides a direct indication of seat belt usage. It is a further object of the present invention to provide an indication of belt usage using a non-contacting sensor.

Accordingly the invention comprises: a seat belt buckle comprising a frame, a locking element movably disposed on the frame and movable between an unlocked position and a locked position, the frame including a locking element receiving opening to receive the locking element when it is moved to its locked position in response to insertion of the tongue having a mating portion which interacts with the locking element. The buckle includes first means for non-contactingly and directly sensing the presence of the locking element within the receiving opening or opening in the tongue and for generating a signal indicative thereof. In the preferred embodiment of the invention the first means includes a Hall effect sensor and a cooperating magnet, however, it should be appreciated that other non-contacting sensing schemes including an optical transmitter and receiver can be substituted. In one embodiment the sensor and magnet are fitted within a lower cover part and in another embodiment the sensor and magnet are mounted directly to the buckle frame.

Many other objects and purposes of the invention will be clear from the following detailed description of the drawings.

DETAILED DESCRIPTION OF THE DRAWINGS

Figure 1:
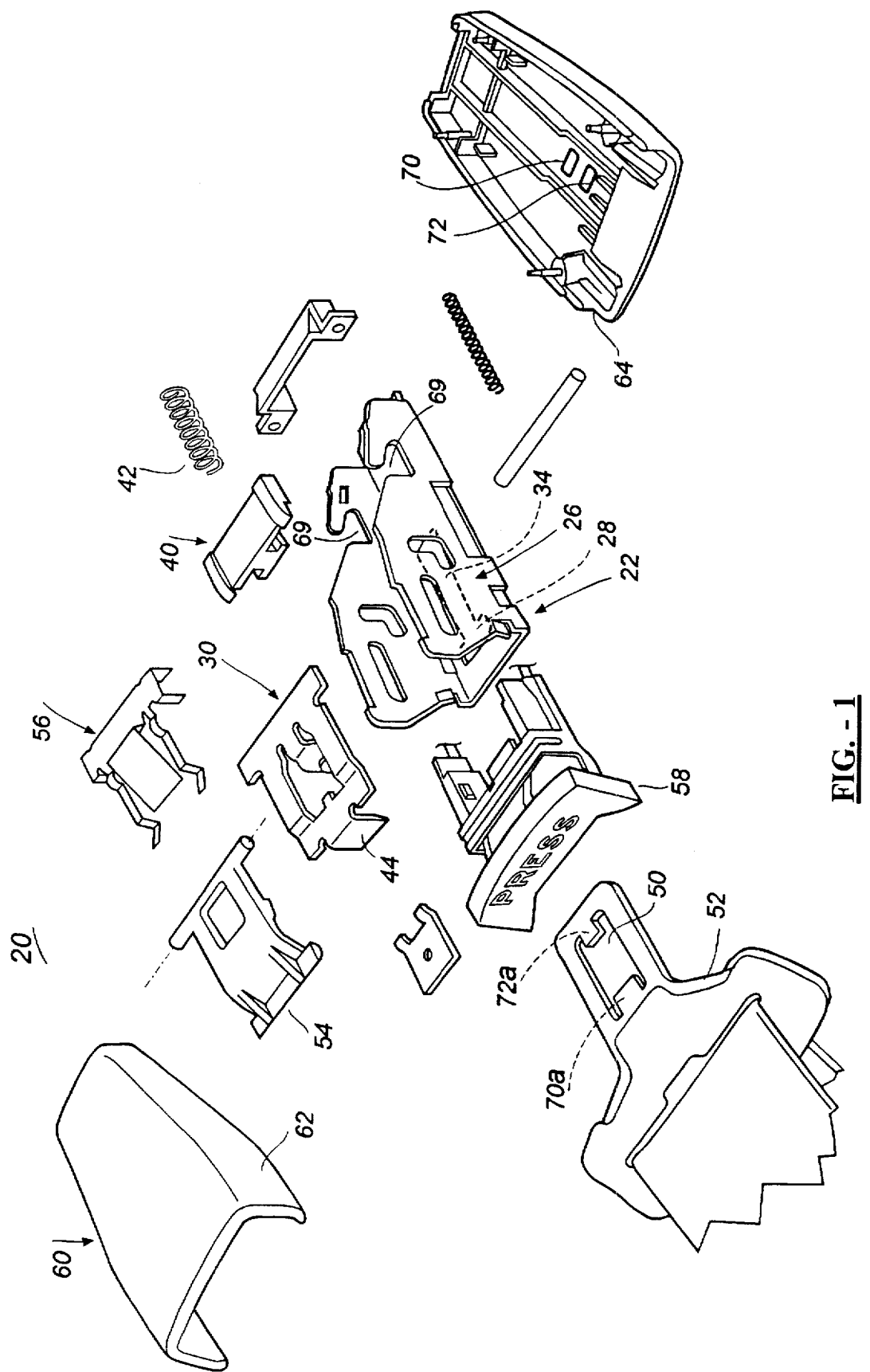
FIG. 1 is an assembly view showing a seat belt buckle incorporating the present invention.

Reference is made to FIG. 1 which shows an end release seat belt buckle 20 such that shown in U.S. Pat. No. 5,341,546 which is incorporated herein by reference. This buckle includes a U-shaped frame 22 having an elongated slot 26 thereon. The slot includes a receiving opening portion 28 to receive a metal locking element 30 that is pivotably mounted on the frame within openings 69 and an elongated portion 34 through which a spring loaded ejector 40, biased by ejector spring 42, is slidably received. The locking member or element includes a downwardly extending projection 44 which when moved to a locking position enters the receiving opening 28 of the slot 26 and is received through an opening 50 of a tongue or latch plate 52. The locking element 44 is biased towards its locking position by a pivoted rocking member 54 biased by a leaf spring 56. A release button 58 is provided to lift the locking element 44 out of the receiving opening 28 of the slot 26 after which the ejector 40 pushes the tongue 52 out of the buckle 20. The various mechanisms described above are enclosed by a cover 60 having mating upper part 62 and lower part 64.

Figure 2:
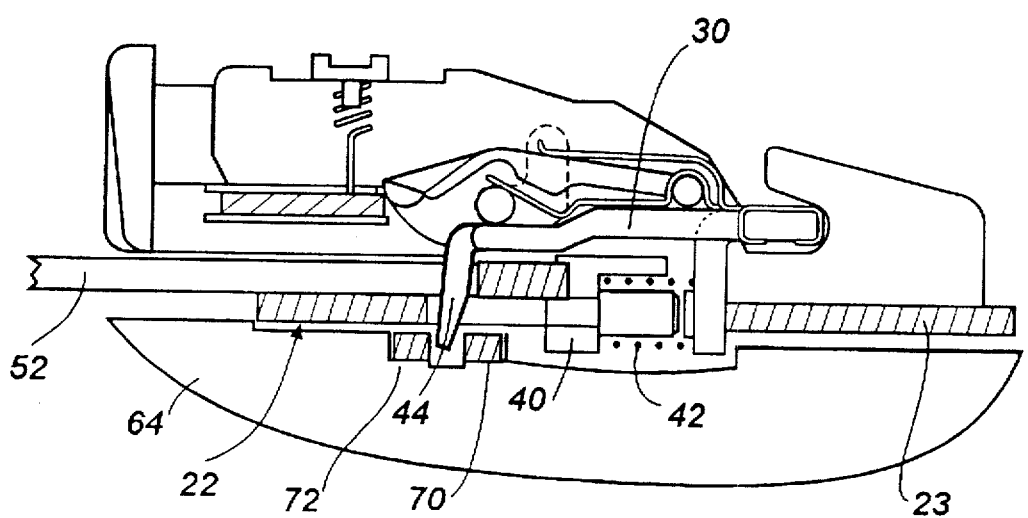
FIG. 2 shows the buckle in an unlatched state.
Figure 3:
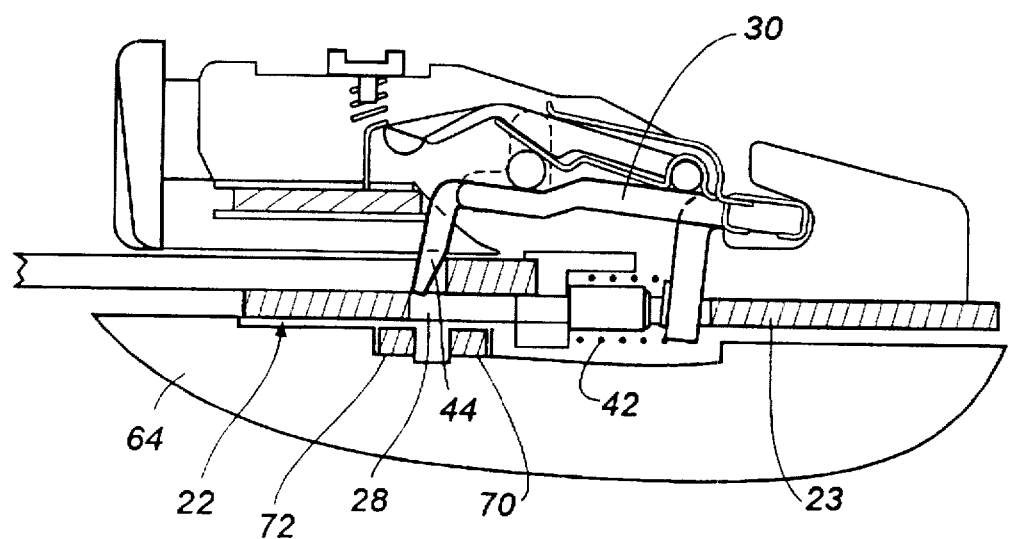
FIG. 3 shows the buckle in a latched or locked state.

Reference is made to FIG. 2 and 3 which respectively illustrate a first embodiment of the invention the locking member is its locked and unlocked positions. In its locked position the tip of the projection 44 extends below the frame 22 and into the opening 50 of the tongue. As can be seen the ejector 40 has been pushed down the slot 34 and spring 42 is compressed. Supported within the lower cover part 64 is a Hall effect sensor 70 of known type and a magnet 72. The magnet 72 and sensor 70 are spaced from one another such that the sensor receives the magnetic flux generated by the magnet 72. The magnet and sensor are located below the frame bottom 23 in a position that as the locking element 30 drops into the receiving opening 28 and through the opening 50 of the tongue the metal locking element will disturb the flux pattern generated by the magnet and this change of flux will be sensed by the sensor 70. As can be seen this construction provides a non-contacting, direct sensing method of determining whether or not the locking element is in its locked position. In the embodiment above the magnet 72 and sensor 70 are installed within the buckle cover part 64 to accommodate that fact that the ejector 40 extends below the frame 22. In other constructions the sensor and magnet can be directly attached to a frame member.

Figure 4:
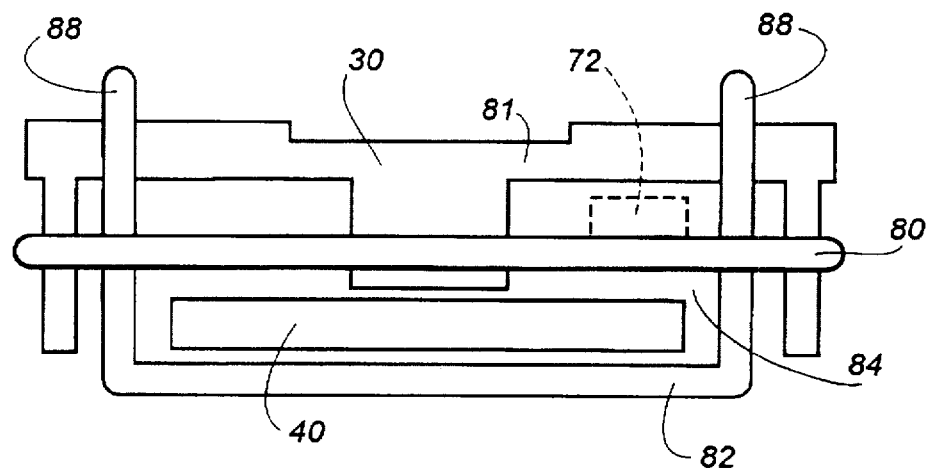
FIG. 4 shows an alternate embodiment of the invention.
Figure 5:
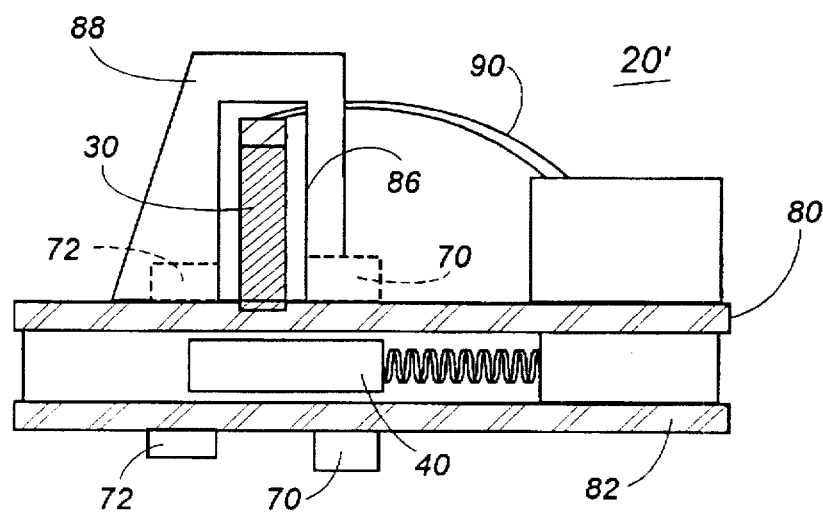
FIG. 5 shows the buckle in an unlatched state.
Figure 6:
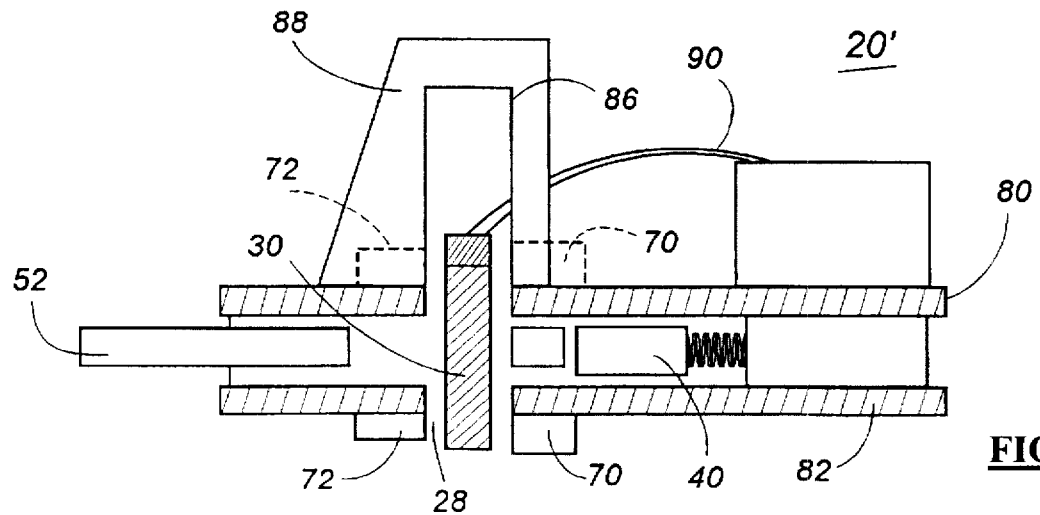
FIG. 6 shows the buckle in a latched or locked state.

Reference is made to FIGS. 4–6 which show an alternate embodiment of the invention. The buckle 20' shown therein is of the type having an upper frame part 80 and lower frame part 82 defining a tongue receiving channel 84 therebetween. The ejector 40 is slidable on the top surface of the lower frame part 82. The lower frame part includes a locking element receiving slot 28. In this buckle 20' the locking element 44 is only movable vertically and is guided by two parallel slots 86 in parallel walls 88. In the locked condition shown in FIG. 6 the tongue 52 has moved the ejector 40 away from the opening 28 permitting a leaf spring 90 biased against the top of the locking element to push and hold the locking element into the receiving opening 28. In this embodiment the magnet 72 and sensor 70 are secured directly to the lower frame member 82. This buckle 20' is protected by upper and lower cover parts (not shown).

Reference is briefly made to FIG. 1 which shows a further alternate embodiment of the invention in which the magnet 72 is attached to the tongue 52 proximate its opening 50 and wherein a Hall effect sensor 70 is positioned opposite the magnet. As can be appreciated as the locking element enters the opening 50 the flux sensed by the sensor 70 will change, this change indicative of the fact the locking element 44 is positioned in its locked condition within the tongue 52. While not shown the sensor 70 is connected to an electric control module which is responsive the signal generated by the sensor 70 or lack thereof and which provides a visual or audible indication that the tongue is properly locked or alternatively not locked or used in a control algorithm to adapt the performance levels of the vehicle restraint system based on occupant conditions. FIGS. 5 and 6 show a further embodiment of the invention in that the magnet 72 and sensor 70 (the location shown in phantom line) are mounted to the upper frame part 80. In this embodiment the magnet and sensor sense that the upper cross-bar 81 portion of the locking element 30, rather than its projection 44, has been lowered into its locking position.

Many changes and modifications in the above described embodiment of the invention can, of course, be carried out without departing from the scope thereof. Accordingly, that scope is intended to be limited only by the scope of the appended claims.

We claim:

1. A seat belt buckle (20,20') comprising a frame (22), a locking element (30) movably disposed on the frame and movable between an unlocked position and a locked position, the frame including a locking element receiving opening (28) to receive the locking element when it is moved to its locked position to lock an itsertable lockable element within the buckle in response to insertion of the lockable element (52) into the buckle, the lockable element having a mating portion (50) which lockingly engages with the locking element when the locking element is in its locked position, first means for directly sensing the presence of the locking element in its locked position and for generating a signal indicative thereof.

2. The device as defined in claim 1 wherein the first means includes magnet (72) positioned proximate the receiving opening (28) for generating a predetermined magnetic flux pattern and a sensing means responsive to a change in the flux pattern created by the presence of the locking element in its locked position.

3. The device as defined in claim 2 wherein the magnet and the sensing means are located within a lower cover part protectively covering the frame and wherein when the locking element is in its locking position it is positioned between the magnet and the sensing means.

4. The device as defined in claim 2 wherein the magnet and the sensing means are mounted to the frame and wherein when the locking element is in its locking position it is positioned between the magnet and the sensing means.

5. The device as defined in claim 4 wherein the magnet and sensor are mounted to sense that an upper cross bar portion of the locking element has moved to its locking position.

6. The device as defined in claim 2 wherein the sensing means includes a Hall effect sensor.

7. The device as defined in claim 2 wherein the magnet and sensing means are spaced from one another and when in its locked position, the locking element is located within such space.

8. The device as defined in claim 1 wherein the first means includes a magnet (72) positioned proximate the mating portion (50) of the lockable element for generating a predetermined magnetic flux pattern and a sensing means positioned to receive the flux and responsive to a change in the flux pattern created by the imposition or removal of the locking element.

9. The device as defined in claim 1 wherein the first means includes means for non-contactingly sensing the presence of the locking element in its locked position.

10. A seat belt buckle (20,20') and insertable and lockable element comprising a frame (22) having a receiving slot to receive the lockable element, a locking element (30) movably disposed on the frame and movable between an unlocked position and a locked position and when in the locked position lockingly engages the lockable element to prevent the lockable element from being removed from the buckle, sensing means comprising a signal generator and a signal receptor for receiving a first signal emanating from the signal generator, the signal generator being spaced from the signal receptor, the signal generator and signal receptor being located in relation to the locking element such that movement of the locking element to its locked position changes the signal level of the first signal, such change of the first signal being only indicative of the fact that the locking element is in its locked position.

11. The device as defined in claim 10 further including means, responsive to an output from the signal receptor, for generating an indication signal indicative that the locking element is in its locked position.

\* \* \* \* \*